United States Patent [19]

Heppke et al.

[11] Patent Number: 4,650,600
[45] Date of Patent: Mar. 17, 1987

[54] LIQUID CRYSTAL PHASE

[75] Inventors: Gerd Heppke; Feodor Oestreicher, both of Berlin, Fed. Rep. of Germany

[73] Assignee: Merck Patent Gesellschaft Mit Beschränkter Haftung, Darmstadt, Fed. Rep. of Germany

[21] Appl. No.: 651,011

[22] Filed: Sep. 17, 1984

[30] Foreign Application Priority Data

Sep. 17, 1983 [DE] Fed. Rep. of Germany ....... 3333677

[51] Int. Cl.$^4$ .......................... G02F 1/13; C09K 19/52
[52] U.S. Cl. .............................. 252/299.01; 252/299.5; 252/299.6; 252/299.61; 252/299.62; 252/299.63; 252/299.64; 252/299.65; 252/299.66; 252/299.67; 252/299.68; 350/350 R; 350/350 S
[58] Field of Search ............. 252/299.5, 299.6, 299.61, 252/299.62, 299.63, 299.64, 299.65, 299.66, 299.67, 299.68, 299.01; 350/250 R, 250 S

[56] References Cited

U.S. PATENT DOCUMENTS

| | | | |
|---|---|---|---|
| 3,977,764 | 8/1976 | Tsukamoto et al. | 252/299.01 |
| 4,113,647 | 9/1978 | Coates et al. | 252/299.62 |
| 4,149,413 | 4/1979 | Gray et al. | 252/299.01 |
| 4,195,916 | 4/1980 | Coates et al. | 252/299.01 |
| 4,264,148 | 4/1981 | Göbl-Wunsch et al. | 252/299.01 |
| 4,293,435 | 10/1981 | Portugall et al. | 252/299.01 |
| 4,400,293 | 8/1980 | Römer et al. | 252/299.63 |
| 4,514,045 | 4/1985 | Huffman et al. | 252/299.1 |
| 4,556,727 | 12/1985 | Walba | 252/299.01 |

FOREIGN PATENT DOCUMENTS

| | | | |
|---|---|---|---|
| 115693 | 8/1984 | European Pat. Off. | 252/299.63 |
| 134570 | 3/1985 | European Pat. Off. | 252/299.63 |
| 168043 | 1/1986 | European Pat. Off. | 252/299.63 |
| 3137058 | 3/1983 | Fed. Rep. of Germany | 252/299.01 |
| 60-199867 | 10/1965 | Japan | 252/299.64 |
| 53-87986 | 8/1978 | Japan | 252/299.66 |
| 57-14822 | 1/1982 | Japan | 252/299.01 |
| 57-63380 | 4/1982 | Japan | 252/299.1 |
| 57-63379 | 4/1982 | Japan | 252/299.1 |
| 57-212418 | 12/1982 | Japan | 252/299.01 |
| 58-46040 | 3/1983 | Japan | 252/299.01 |
| 60-188347 | 9/1985 | Japan | 252/299.64 |
| 60-199856 | 10/1985 | Japan | 252/299.64 |
| 60-237048 | 11/1985 | Japan | 252/299.64 |
| 60-255779 | 12/1985 | Japan | 252/299.61 |

OTHER PUBLICATIONS

Göbl-Wunsch, K., et al., J. De Physique, vol. 40, pp 773–777 (1979).
Diehl, R., et al., Abstract I4-Oral, Abstracts of the Tenth International Liquid Crystal Conference, York, U.K., Jul. 15–21, 1984.
Demus, D., et al., Flussige Kristalle in Tabellen, Veb Deutscher Verlag for Grundstoffindustrie, Leipzig, pp. 294–305 (1974).

Primary Examiner—Teddy S. Gron
Attorney, Agent, or Firm—Millen & White

[57] ABSTRACT

Liquid crystal phases containing at least one chiral, compound with at least two chiral centers in the molecule which are adjacent or separated from one another by an acyclic chain, preferably at least one optically active compound of the formula I $$R^1-\text{CHCH}_3-\text{CHCH}_3-R^2 \qquad \text{I}$$

wherein $R^1$ and $R^2$ independently of one another are each a group $-Z^1-(A^1)_m-Z^2-(A^2)_n-Y$, wherein
$A^1$ and $A^2$ in each case independently of one another are a 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)-octylene group, it also being possible for these to be mono-substituted or poly-substituted by F, Cl, Br, CN and/or alkyl groups with up to 12 C atoms, it being possible for 1 or 2 $CH_2$ groups in the alkyl groups to be replaced by O atoms,
$Z^1$ is $-O-CO-$, $-CO-O-$, $-O-$ or a single bond,
$Z^2$ is $-CO-O-$, $-O-CO-$, $-CH_2CH_2-$, $-OCH_2-$, $-CH_2O-$, $-CH=N-$, $-N=CH-$, $-N=N-$, $-N(O)=N-$ or a single bond, m and n in each case independently of one another are 0, 1 or 2 and
Y is a straight-chain or branched alkyl group with up to 12 C atoms, it being possible for 1 or 2 $CH_2$ groups to be replaced by O atoms, or, if n is 1 or 2, Y is also F, Cl, Br or CN, exhibit electro-optical properties, which are independent of temperature over a wide range.

17 Claims, 2 Drawing Figures

LIQUID CRYSTAL PHASE

BACKGROUND OF THE INVENTION

Liquid crystal phases which form a helix structure with a given direction of rotation are increasingly required for liquid crystal displays. Thus, materials of this type are required, for example, for the Schadt-Helfrich effect in order to avoid the undesirable effect of "reverse twist" (E. Guyon and W. Urbach in "Nonemissive Electrooptic Displays", edited by A. R. Kmetz, F. K. von Willisen, Plenum Press, New York-London, 1976, page 127), for the cholesteric-nematic phase transition effect and for bistability effects.

An important problem here is the production of a suitable temperature function of the helix pitch, which depends on the particular electrooptical effect and its particular embodiment.

For example, for liquid crystal display elements based on the twisted nematic cell, a temperature-independent pitch is suitable for avoiding "reverse twist". Furthermore, it has been possible to show that compensation of the temperature drift of the threshold voltage of a twisted nematic cell can be achieved if the helix pitch decreases as the temperature increases (P. R. Gerber, Physics Letters 78A, 285 (1980)). Similarly, for the phase transition effect, compensation of the threshold voltage drift is achieved by a helix pitch which decreases greatly as the temperature increases (A. Göbl-Wunsch, G. Heppke and F. Oestreicher, Journal de Physique 40, 773 (1979)).

The liquid crystal phases used for this purpose generally consist of mixtures of non-chiral liquid crystal compounds to which chiral compounds are added to produce the helix structure. Virtually all the known chiral doping substances induce helix structures, the pitches of which increase to a greater or lesser degree over wide ranges as the temperature increases. In the literature, only certain spirobiindane derivatives with a negative temperature function gradient are reported (Advances of Infrared and Raman Spectroscopy 8 (1981) Chapter 4). However, in practice, it has not been possible to eliminate the troublesome temperature drift with these compounds. It has hitherto been possible to achieve the negative temperature function gradient frequently desired only by using two suitable doping substances of different direction of rotation and different relative temperature dependency (German . . . No. 2,827,471). The disadvantages of this multiple-doping process are, inter alia, the maintenance of the exact concentration ratio of the two chiral compounds and the restriction to a limited temperature range as well as the high overall concentration required for the doping substances (A. Göbl-Wunsch, G. Heppke and F. Oestreicher, Journal de Physique, 40, 773 (1979)). Outdoor applications are therefore impossible.

SUMMARY OF THE INVENTION

It is thus an object of this invention to provide a liquid crystal phase which has temperature-independent electrooptical parameters, in particular a temperature-independent threshold voltage, and which achieves these properties with the aid of only a single doping substance.

It is a further object of this invention to provide chiral compounds which induce a negative gradient of the temperature function of the pitch in liquid crystal phases for indoor and outdoor use over a wide temperature range, while at the same time having a high twisting capacity.

Upon further study of the specification and appended claims, further objects and advantages of this invention will become apparent to those skilled in the art.

According to this invention, these objects are achieved by a liquid crystal phase described herein and by providing the compounds of the formula I. It has been found that the compounds of the formula I fulfill the above requirements in an outstanding manner.

The invention relates to a liquid crystal phase with at least one chiral compound, characterized in that it contains at least one chiral compound with at least two chiral centers in the molecule which are adjacent to or separated from one another by an acyclic chain. Particularly suitable liquid crystal phases are those containing at least one optically active compound of the formula I

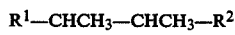

$$R^1-CHCH_3-CHCH_3-R^2 \qquad I$$

wherein $R^1$ and $R^2$ independently of one another are each a group $-Z^1-(A^1)_m-Z^2-(A^2)_n-Y$, wherein $A^1$ and $A^2$ in each case independently of one another are a 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)-octylene group, it also being possible for these to be mono-substituted or poly-substituted by F, Cl, Br, Cn and/or alkyl groups with up to 12 C atoms, it being possible for 1 or 2 non-adjacent $CH_2$ groups in the alkyl groups to be replaced by 0 (oxa) atoms, $Z^1$ is $-O-CO-$, $-CO-O-$, $-O-$ or a single bond, $Z^2$ is $-CO-O-$, $-O-CO-$, $-CH_2CH_2-$, $-OCH_2-$, $-CH_2O-$, $-CH=N-$, $-N=CH-$, $-N=N-$, $-N(O)=N-$ or a single bond, m and n in each case independently of one another are 0, 1 or 2 and Y is a straight-chain or branched alkyl group with up to 12 C atoms, it being possible for 1 or 2 non-adjacent $CH_2$ groups to be replaced by 0 (oxa) atoms, or, if n is 1 or 2, Y is also F, Cl, Br or CN.

The invention furthermore relates to a liquid crystal display element containing a liquid crystal phase according to the invention.

The invention furthermore relates to the use of chiral compounds with at least two chiral centers in the molecule which are adjacent or separated from one another by an acyclic chain, preferably of compounds of the formula I, for temperature compensation in liquid crystal phases.

The invention also relates to a method for temperature compensation in liquid crystal display elements containing a liquid crystal phase, in which at least 0.05% of at least one chiral compound with at least two chiral centers in the molecule which are adjacent or separated from one another by an acyclic chain, preferably at least one compound of the formula I, is admixed to the liquid crystal phase.

Temperature-compensated liquid crystal phases or liquid crystal display elements are to be understood as liquid crystal phases or liquid crystal display elements with electrooptical parameters which are essentially independent of the temperature, in particular with an essentially temperature-independent threshold voltage over the range of normal uses, e.g., −40° C. to +100° C., preferably −20° C. to +80° C.

BRIEF DESCRIPTION OF THE DRAWINGS

Various other objects, features and attendant advantages of the present invention will be more fully appreciated as the same becomes better understood when considered in conjunction with the accompanying drawings, and wherein.

DETAILED DISCUSSION

Figure 1:
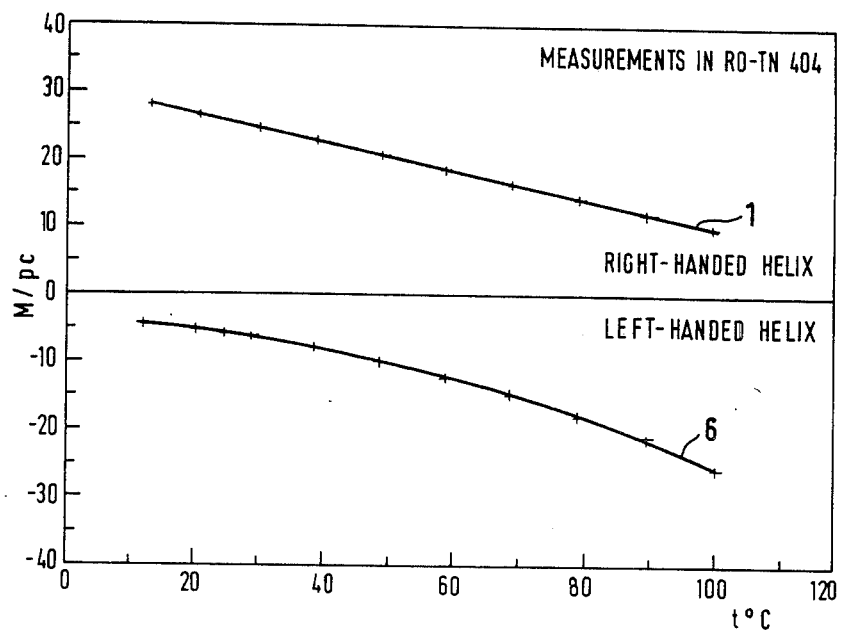
FIGS. 1 and 2 display some of the advantageous properties of some liquid crystal phases of this invention.

The liquid crystal phase according to the invention contains at least one chiral compound with at least two chiral centers which are adjacent or separated from one another by an acyclic chain.

The acyclic chain can be, in particular, a substituted or unsubstituted alkylene group, it being possible for one or more $CH_2$ groups to be replaced by heteroatoms. Particularly preferred acyclic chains are those from the group comprising —$(CH_2)_p$—, —CH=CX—, —C≡C—, —COO—, —COS—, —CH=N—, —O—, —$CH_2$O— wherein P is preferably 1, 2 or 3 and X is halogen, preferably fluorine or chlorine, CN or $CH_3$, and combinations of these chains.

A chiral center arises if part of a molecule is such that it cannot be superimposed on its mirror image. This is the case, for example, if a C atom is surrounded tetrahedrally by four different ligands. However, as is known to those of skill in the art, chiral centers can be produced in a different manner, for example by formation of a chirality axis or plane.

The compounds of the formula I include compounds of the part formulae Ia to Iu:

| | |
|---|---|
| Y—$CHCH_3$—$CHCH_3$—Y | Ia |
| Y—$CHCH_3$—$CHCH_3$—OCOY | Ib |
| Y—$CHCH_3$—$CHCH_3$—$Z^1$—$A^1$—Y | Ic |
| Y—$CHCH_3$—$CHCH_3$—$Z^1$—$A^1$—$A^2$—Y | Id |
| Y—$CHCH_3$—$CHCH_3$—$Z^1$—$A^1$—$Z^2$—$A^2$—Y | Ie |
| Y—$CHCH_3$—$CHCH_3$—$Z^1$—$(A^1)_2$—$Z^2$—$A^2$—Y | If |
| Y—$CHCH_3$—$CHCH_3$—$Z^1$—$A^1$—$Z^2$—$(A^1)_2$—Y | Ig |
| YCOO—$CHCH_3$—$CHCH_3$—OCOY | Ih |
| YCOO—$CHCH_3$—$CHCH_3$—$Z^1$—$A^1$—Y | Ii |
| YCOO—$CHCH_3$—$CHCH_3$—$Z^1$—$A^1$—$A^2$—Y | Ij |
| YCOO—$CHCH_3$—$CHCH_3$—$Z^1$—$A^1$—$Z^2$—$A^2$—Y | Ik |
| YCOO—$CHCH_3$—$CHCH_3$—$Z^1$—$(A^1)_2$—$Z^2$—$A^2$—Y | Il |
| YCOO—$CHCH_3$—$CHCH_3$—$Z^1$—$A^1$—$Z^2$—$(A^2)_2$—Y | Im |
| Y—$A^1$—$Z^1$—$CHCH_3$—$CHCH_3$—$Z^1$—$A^1$—Y | In |
| Y—$A^1$—$Z^1$—$CHCH_3$—$CHCH_3$—$Z^1$—$A^1$—$A^2$—Y | Io |
| Y—$A^1$—$Z^1$—$CHCH_3$—$CHCH_3$—$Z^1$—$A^1$—$Z^2$—$A^2$—Y | Ip |
| Y—$A^1$—$Z^1$—$CHCH_3$—$CHCH_3$—$Z^1$—$(A^1)_2$—$Z^2$—$A^2$—Y | Iq |
| Y—$A^1$—$Z^1$—$CHCH_3$—$CHCH_3$—$Z^1$—$A^1$—$Z^2$—$(A^2)_2$—Y | Ir |
| Y—$A^1$—$A^2$—$Z^1$—$CHCH_3$—$CHCH_3$—$Z^1$—$A^1$—$A^2$—Y | Is |
| Y—$A^1$—$A^2$—$Z^1$—$CHCH_3$—$CHCH_3$—$Z^1$—$A^1$—$Z^2$—$A^2$—Y | It |
| Y—$A^2$—$Z^2$—$A^1$—$Z^1$—$CHCH_3$—$CHCH_3$—$Z^1$—$A^1$—$Z^2$—$A^2$—Y | Iu |

In the compounds of the formulae mentioned above and below, Y is preferably alkyl, and furthermore alkoxy, another oxaalkyl group, CN or F.

In the compounds of the formulae above and below, the alkyl radicals, in which one ("alkoxy" or "oxaalkyl") or two $CH_2$ groups ("alkoxyalkoxy" or "dioxaalkyl") can also be replaced by 0 atoms, are straight-chain or branched. They are preferably straight-chain and have 2, 3, 4, 5, 6 or 7 C atoms, and are accordingly preferably ethyl, propyl, butyl, pentyl, hexyl, heptyl, ethoxy, propoxy, butoxy, pentoxy, hexoxy, heptoxy, 2-oxapropyl (=methoxymethyl), 2-oxabutyl (=ethox-ymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, methyl, octyl, nonyl, decyl, methoxy, octoxy, nonoxy, decoxy, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl, 1,3-dioxabutyl (=methoxymethoxy), 1,3-, 1,4- or 2,4-dioxapentyl, 1,3-, 1,4-, 1,5-, 2,4-, 2,5- or 3,5-dioxahexyl or 1,3-, 1,4-, 1,5-, 1,6-, 2,4-, 2,5-, 2,6-, 3,5-, 3,6- or 4,6-dioxaheptyl.

Compounds of the formulae I and Ia to Iu with branched end groups may also be important. Branched groups of this type as a rule contain not more than one chain branching. Preferred branched radicals Y are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl and 3-oxa-4-methylpentyl.

For simplicity, in the following text "Phe" is a 1,4-phenylene group, "Cy" is a 1,4-cyclohexylene group, "Dio" is a 1,3-dioxane-2,5-diyl group, "Bi" is a bicyclo-(2,2,2)-octylene group and "Pyr" is a pyrimidine-2,5-diyl group, it being possible for these groups to be unsubstituted or mono- or poly-substituted by F, Cl, Br, CN and/or alkyl groups with up to 12 C atoms, it being possible for 1 or 2 $CH_2$ groups in the alkyl groups to be replaced by 0 atoms. Typically, the number of substituents will be 0-2.

$A^1$ and $A^2$ in each case independently of one another are preferably Cy, Phe or Dio; the compound of the formula I preferably contains not more than one of the radicals Dio, Bi or Pyr.

$Z^1$ and $Z^2$ are preferably single bonds or carboxyl groups. $Z^2$ furthermore is preferably a —$CH_2CH_2$— group. (m+n) is preferably 0, 1, 2 or 3, particularly preferably 0 or 2.

Preferred groups $R_1$ and $R_2$ are:
—Cy—Phe—Y
—Phe—Cy—Y
—Phe—Phe—Y
—Cy—Cy—Y
—Phe—Phe—Phe—Y
—Cy—Phe—Phe—Y
—Cy—CY—Phe—Y
—Dio—Phe—Phe—Y
—Dio—Cy—Y
—Dio—Phe—Y
—Pyr—Phe—Y
—Pyr—Cy—Y
—$(A^1)_2$—$A^2$—Y
—$A^1$—$CH_2CH_2$—$A^2$—Y
—$A^1$—COO—$A^2$—Y
—$A^1$—OCO—$A^2$—Y
—Cy—Ph—$CH_2CH_2$—Cy—Y
—Cy—COO—Cy—Y
—Cy—COO—Ph—Y and
—Ph—COO—Ph—Y The compounds of the formula I preferably contain 0, 1, 2, 3, 4, 5 or 6 ring structures $A^1$ and $A^2$. Compounds with 2 to 4 ring structures $A^1$ and $A^2$ are particularly preferred.

Preferred compounds of the formulae I and Ia to Iu are those in which at least one of the radicals contained therein has one of the preferred meanings mentioned.

Of the compounds of the formula I, an enantiomer pair in each case exists for the erythro-form and the threo-form, the first corresponding to the meso-form in the case of symmetric compounds of the formula I. The pure, separated enantiomers of the erythro-form or threo-form are preferably used for temperature compensation in liquid crystal displays, the threo-form being particularly preferred.

The liquid crystal phases according to the invention consist of 2 to 18, preferably 3 to 15, components, at least one of which is a compound of the formula I. The other constituents are preferably chosen from the nematic or nematogenic substances, in particular the known substances, from the classes of azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbenzenes, 4,4'-bis-cyclohexylbiphenyls, phenyl- or cyclohexyl-pyrimidines, phenyl- or cyclohexyl-dioxanes, optionally halogenated stilbenes, benzyl phenyl ethers, tolanes and substituted cinnamic acids.

The most important compounds suitable as constituents of such liquid crystal phases can be characterised by the formula III

wherein L and E are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G is

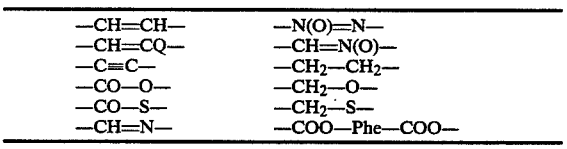

or a C—C single bond, Q is halogen, preferably chlorine, or —CN, and $R^3$ and $R^4$ are each alkyl, alkoxy, alkanoyloxy or alkoxycarbonyloxy with up to 18, preferably up to 8, carbon atoms, or one of these radicals is also CN, NC, $NO_2$, $CF_3$, F, Cl or Br.

In most of these compounds, $R^3$ and $R^4$ differ, one of these radicals usually being an alkyl or alkoxy group. Other variants of the substituents envisaged are also customary. Many such substances or mixtures thereof are commercially available. All of these substances can be prepared by methods which are known from the literature.

The liquid crystal phases according to the invention contain at least 0.05% of at least one compound of the formula I. They preferably contain about 0.05 to 35%, in particular 0.1 to 10%, of one or more compounds of the formula I.

Liquid crystal phases according to the invention which are particularly preferred for liquid crystal dielectrics contain 0.1 to 3% of one or more compounds of the formula I. Dielectrics containing only one compound of the formula I are particularly preferred.

The liquid crystal phases according to the invention are prepared in a manner which is customary per se. As a rule, the components are dissolved in one another, advantageously at elevated temperature. The liquid crystal phases according to the invention can be modified by suitable additives so that they can be used in all the types of liquid crystal display elements which have so far been disclosed.

The compounds of the formula I can furthermore be used, if appropriate, also without the admixing of other components, as liquid crystal phases for temperature indicators.

The abovementioned additives are known to the expert and are described in detail in the literature. For example, it is possible to add conductive salts, preferably ethyl-dimethyl-dodecylammonium 4-hexyloxybenzoate, tetrabutylammonium tetraphenylboranate or complex salts of crown ethers (compare, for example, I. Haller et al., Mol. Cryst. Liq. Cryst. Volume 24, pages 249–258 (1973)), to improve the conductivity, dichroic dyestuffs, to prepare colored guest-host systems, or substances for modifying the dielectric anisotropy, the viscosity and/or the orientation of the nematic phases. Such substances are described, for example, in German Offenlegungsschriften Nos. 2,209,127, 2,240,864, 2,321,632, 2,338,281, 2,450,088, 2,537,430, 2,853,728 and 2,902,177.

Figure 2:
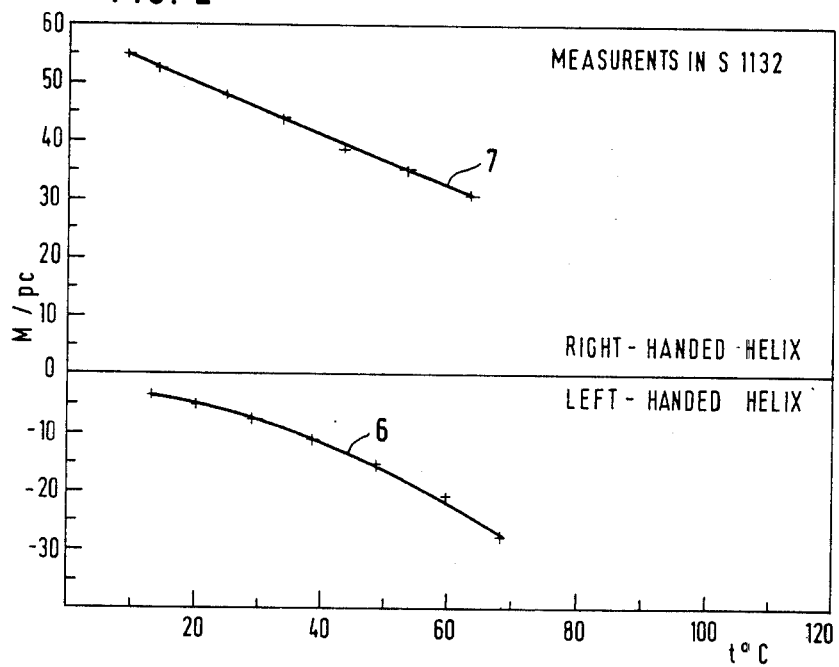

FIGS. 1 and 2 show the advantageous properties for some liquid crystal phases of this invention.

FIG. 1 shows the temperature-dependencies of the "molecular twisting power" M/pc (M=molecular weight in g/mol; p=pitch in $\mu$m; c=concentration in % by weight) for some dielectrics according to the invention [compounds of the formula I in RO-TN 404 (commercially available nematic mixture based on cyanopyrimidines); 1=2,3-bis-(p-hexoxybenzoyloxy)-butane, 6=2,3-bis-(trans,trans-4-n-pentyl-cyclohexylcyclohexyl-4'-carbonyloxy)-butane].

The use of the compounds of the formula I produces very similar temperature properties of all the liquid crystal phases in this plot, which is evidently a consequence of the common molecular structure feature, that is to say the arrangement, according to the invention, of the two chiral centres in the chiral compound.

The compounds of the formula I enable a liquid crystal phase with essentially temperature-independent electrooptical parameters to be obtained with one doping substance in average temperature ranges. On this plot, the effect achieved by the choice of the various groups $R^1$ and $R^2$ can be described essentially as a shift in the inversion temperature towards higher temperatures and, preferably, lower temperatures.

The inversion temperature is preferably outside the operating range of the liquid crystal cell, which means that the occurrence of "reverse twist" is avoided in this temperature range.

FIG. 2 shows the temperature functions for two other liquid crystal phases according to the invention [compounds of the formula I in ZLI 1132 (commercially available nematic mixture from E. Merck, Darmstadt); 6=2,3-bis-(trans,trans-4-n-pentylcyclohexylcyclohexyl-4'-carbonyloxy)-butane, 7=2,3-bis-(p-2-methylbutylbenzoyloxy)-butane].

It can be seen that the principal course of the temperature functions is essentially independent of the nematic base material used.

The concentration of the compounds of the formula I in the liquid crystal phases shown in FIGS. 1 and 2 is in each case 1.6%.

The mixture ZLI-1132 mentioned above and below is composed of
24% of p-trans-4-propylcyclohexyl-benzonitrile,
36% of p-trans-4-pentylcyclohexyl-benzonitrile,
25% of p-trans-4-heptylcyclohexyl-benzonitrile and
15% of 4-cyano-4'-(trans-4-pentylcyclohexyl)-biphenyl.

Herein, as is conventional, electro-optical properties are considered essentially independent of temperature if they vary by about ±0,4 percent or less per degree centigrade in the temperature range of 0° C. to 40° C., ±0,15 percent or less per degree centigrade or preferably ±0,05 percent or less per degree centigrade in the temperature range of −20° C. to +80° C. These deviations refer to the electro-optical properties at 20° C. Those of skill in the art will readily recognize that the nature of the temperature constancy will vary in accordance with the conventional stringency of the requirements for the particular application of interest.

All of the chiral compounds required by this invention are known and/or readily prepared from known starting materials using fully conventional chemical methods and techniques. For those chiral compounds of this invention which are not per se known, they can be prepared by analogy to the known methods for preparing compounds which are already known. See for example Houben-Weyl, Methoden der Organischen Chemie (Methods of Organic Chemistry), Georg-Thieme Verlag, Stuttgart; Organic Reactions, John Wiley & Sons, Inc., New York; Morrison and Mosher, Asymmetric Organic Reactions, Prentice-Hall, Inc., Englewood Cliffs, N.Y., 1971; Wilen, Top. Stereochem. 6, 107–176 (1971); March, Advanced Organic Chemistry, Mc Graw-Hill series in Advanced Chemistry, McGraw-Hill Kogakusha, Tokyo, 1977, whose disclosure is incorporated by reference herein. See also the examples herein which disclose typical conventional reactions which can be used to prepare the compounds useful in this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples and in the preceding text, all temperatures are set forth uncorrected in degrees Celsius and all parts and percentages are by weight, unless otherwise indicated.

In the examples, m.p. is the melting point and c.p. is the clear point of a liquid crystal substance.

"Customary working up" means: water is added, the mixture is extracted with methylene chloride, the organic phase is separated off, dried and evaporated and the product is purified by crystallization and/or chromatography.

EXAMPLE 1

6.4 g of p-(trans-4-n-pentylcyclohexyl)-benzoic acid chloride [obtainable by reacting p-(trans-4-n-pentylcyclohexyl)-benzoic acid (from p-trans-4-n-pentylcyclohexylbenzonitrile) with thionyl chloride] in 20 ml of toluene are added dropwise to a mixture of 1 ml of D-(−)-2,3-butanediol, 20 ml of toluene and 2.4 ml of pyridine at 50°. The reaction mixture is boiled under reflux for 8 hours. The pyridinium chloride is filtered off hot with suction and the filtrate is worked up in the customary manner. Optically active 2,3-bis-(p-trans-4-n-pentylcyclohexylbenzoyloxy)-butane of m.p. 138.5° is obtained.

The following compounds are prepared analogously:
2,3-bis-(p-trans-4-ethylcyclohexylbenzoyloxy)-butane
2,3-bis-(p-trans-4-propylcyclohexylbenzoyloxy)-butane
2,3-bis-(p-trans-4-butylcyclohexylbenzoyloxy)-butane
2,3-bis-(p-trans-4-hexylcyclohexylbenzoyloxy)-butane
2,3-bis-(p-trans-4-heptylcyclohexylbenzoyloxy)-butane
2,3-bis-(p-trans-4-octylcyclohexylbenzoyloxy)-butane, m.p. 112°,
2,3-bis-(p-trans-4-decylcyclohexylbenzoyloxy)-butane
2,3-bis-[p-(p'-trans-4-ethylcyclohexylphenyl)-benzoyloxy]-butane
2,3-bis-[p-(p'-trans-4-propylcyclohexylphenyl)-benzoyloxy]-butane
2,3-bis-[p-(p'-trans-4-butylcyclohexylphenyl)-benzoyloxy]-butane
2,3-bis-[p-(p'-trans-4-pentylcyclohexylphenyl)-benzoyloxy]-butane, m.p. 182°, c.p. 245°–252° (cholestericisotropic; the compound displays brilliant selective reflective colors changing from blue to red on cooling)
2,3-bis[p-(p'-trans-4-hexylcyclohexylphenyl)-benzoyloxy]-butane
2,3-bis-[p-(p'-trans-4-heptylcyclohexylphenyl)-benzoyloxy]-butane
2,3-bis-[p-(p'-trans-4-octylcyclohexylphenyl)-benzoyloxy]-butane
2,3-bis-[p-(p'-trans-4-decylcyclohexylphenyl)-benzoyloxy]-butane
2,3-bis-(trans,trans-4-ethylcyclohexylcyclohexyl-4'-carbonyloxy)-butane
2,3-bis-(trans,trans-4-propylcyclohexylcyclohexyl-4'-carbonyloxy)-butane
2,3-bis-(trans,trans-4-butylcyclohexylcyclohexyl-4'-carbonyloxy)-butane
2,3-bis-(trans,trans-4-pentylcyclohexylcyclohexyl-4'-carbonyloxy)-butane, m.p. 187°,
2,3-bis-(trans,trans-4-hexylcyclohexylcyclohexyl-4'-carbonyloxy)-butane
2,3-bis-(trans,trans-4-heptylcyclohexylcyclohexyl-4'-carbonyloxy)-butane
2,3-bis-(trans,trans-4-octylcyclohexylcyclohexyl-4'-carbonyloxy)-butane
2,3-bis-(trans,trans-4-decylcyclohexylcyclohexyl-4'-carbonyloxy)-butane
2,3-bis-[p-(p'-ethoxybenzoyloxy)-benzoyloxy]-butane
2,3-bis-[p-(p'-propoxybenzoyloxy)-benzoyloxy]-butane
2,3-bis-[p-(p'-butoxybenzoyloxy)-benzoyloxy]-butane
2,3-bis-[p-(p'-pentoxybenzoyloxy)-benzoyloxy]-butane
2,3-bis-[p-(p'-hexoxybenzoyloxy)-benzoyloxy]-butane, m.p. 133°,
2,3-bis-[p-(p'-heptoxybenzoyloxy)-benzoyloxy]-butane
2,3-bis-[p-(p'-octoxybenzoyloxy)-benzoyloxy]-butane
2,3-bis-[p-(p'-decoxybenzoyloxy)-benzoyloxy]-butane
2,3-bis-[p-(p'-cyanobenzoyloxy)-benzoyloxy]-butane
2,3-bis-[p-(p'-ethylbenzoyloxy)-benzoyloxy]-butane
2,3-bis-[p-(p'-butylbenzoyloxy)-benzoyloxy]-butane
2,3-bis-[p-(p'-pentylbenzoyloxy)-benzoyloxy]-butane
2,3-bis-[p-(p'-heptylbenzoyloxy)-benzoyloxy]-butane
2,3-bis-(p-ethoxybenzoyloxy)-butane
2,3-bis-(p-propoxybenzoyloxy)-butane
2,3-bis-(p-butoxybenzoyloxy)-butane
2,3-bis-(p-pentoxybenzoyloxy)-butane
2,3-bis-(p-hexoxybenzoyloxy)-butane, m.p. 52°,
2,3-bis-(p-heptoxybenzoyloxy)-butane
2,3-bis-(p-octoxybenzoyloxy)-butane
2,3-bis-(p-decoxybenzoyloxy)-butane 2,3-bis-(p-ethylbenzoyloxy)-butane
2,3-bis-(p-propylbenzoyloxy)-butane
2,3-bis-(p-butylbenzoyloxy)-butane
2,3-bis-(p-pentylbenzoyloxy)-butane
2,3-bis-(p-hexylbenzoyloxy)-butane
2,3-bis-(p-heptylbenzoyloxy)-butane
2,3-bis-(p-octylbenzoyloxy)-butane
2,3-bis-(p-decylbenzoyloxy)-butane
2,3-bis-(p-1-methylpropylbenzoyloxy)-butane
2,3-bis-(p-(R)-2-methylpropylbenzoyloxy)-butane
2,3-bis-(p-(R)-methylbutylbenzoyloxy)-butane, colourless oil, no m.p. down to $-20°$,
2,3-bis-(p-(S)-3-methylbutylbenzoyloxy)-butane
2,3-bis-(p-(R)-2-methylpentylbenzoyloxy)-butane
2,3-bis-(p-2-ethylhexylbenzoyloxy)-butane
2,3-bis-(p-(S)-2-methylpropoxybenzoyloxy)-butane
2,3-bis-(p-(R)-2-methylbutoxybenzoyloxy)-butane
2,3-bis-(p-(S)-3-methylbutoxybenzoyloxy)-butane
2,3-bis-(p-(R)-2-methylpentoxybenzoyloxy)-butane
2,3-bis-(p-2-ethylhexoxybenzoyloxy)-butane and
2,3-bis-(p-(R)-2-oxa-3-methylbutylbenzoyloxy)-butane.

EXAMPLE 2

0.25 g of propionyl chloride is added to 0.8 g of optically active 3-p-(5-butyl-1,3-dioxan-2-yl)-benzoyloxy-2-butanol in 20 ml of benzene and 1 ml of pyridine and the mixture is heated under reflux for 5 hours. After customary working up, 3-p-(5-butyl-1,3-dioxan-2-yl)-benzoyloxy-2-propionyloxy-butane is obtained.

The following compounds are prepared analogously:
3-p-(5-butyl-1,3-dioxan-2-yl)-benzoyloxy-2-acetoxy-butane
3-p-(5-butyl-1,3-dioxan-2-yl)-benzoyloxy-2-butanoyloxy-butane
3-p-(5-butyl-1,3-dioxan-2-yl)-benzoyloxy-2-pentanoyloxy-butane
3-p-(5-butyl-1,3-dioxan-2-yl)-benzoyloxy-2-hexanoyloxy-butane
3-p-(5-butyl-1,3-dioxan-2-yl)-benzoyloxy-2-decanoyloxy-butane
3-p-(trans-4-n-pentylcyclohexyl)-benzoyloxy-2-acetoxy-butane
3-p-(trans-4-n-pentylcyclohexyl)-benzoyloxy-2-propionyloxy-butane
3-p-(trans-4-n-pentylcyclohexyl)-benzoyloxy-2-butanoyloxy-butane
3-p-(trans-4-n-pentylcyclohexyl)-benzoyloxy-2-pentanoyloxy-butane
3-p-(trans-4-n-pentylcyclohexyl)-benzoyloxy-2-hexanoyloxy-butane
3-p-(trans-4-n-pentylcyclohexyl)-benzoyloxy-2-decanoyloxy-butane
3-p-cyanobenzoyloxy-2-acetoxy-butane
3-p-cyanobenzoyloxy-2-propionyloxy-butane
3-p-cyanobenzoyloxy-2-butanoyloxy-butane
3-p-cyanobenzoyloxy-2-pentanoyloxy-butane
3-p-cyanobenzoyloxy-2-hexanoyloxy-butane
3-p-cyanobenzoyloxy-2-decanoyloxy-butane
3-p-ethylbenzoyloxy-2-acetoxy-butane
3-p-ethylbenzoyloxy-2-propionyloxy-butane
3-p-ethylbenzoyloxy-2-butanoyloxy-butane
3-p-ethylbenzoyloxy-2-pentanoyloxy-butane
3-p-ethylbenzoyloxy-2-hexanoyloxy-butane and
3-p-ethylbenzoyloxy-2-decanoyloxy-butane.

EXAMPLE 3

0.7 g of D-(−)-3-propoxy-2-butanol, 1.5 g of p-(trans-4-n-pentylcyclohexyl)-benzoic acid chloride, 20 ml of toluene and 2.1 ml of pyridine are boiled under reflux for 6 hours. The pyridinium chloride is filtered off hot with suction and the filtrate is worked up in the customary manner. Optically active 3-propoxy-2-[p-(trans-4-n-pentylcyclohexyl)-benzoyloxy]-butane is obtained.

The following compounds are prepared analogously:
3-methoxy-2-[p-(trans-4-n-pentylcyclohexyl)-benzoyloxy]-butane
3-ethoxy-2-[p-(trans-4-n-pentylcyclohexyl)-benzoyloxy]-butane
3-butoxy-2-[p-(trans-4-n-pentylcyclohexyl)-benzoyloxy]-butane
3-pentoxy-2-[p-(trans-4-n-pentylcyclohexyl)-benzoyloxy]-butane
3-hexoxy-2-[p-(trans-4-n-pentylcyclohexyl)-benzoyloxy]-butane
3-heptoxy-2-[p-(trans-4-n-pentylcyclohexyl)-benzoyloxy]-butane
3-decoxy-2-[p-(trans-4-n-pentylcyclohexyl)-benzoyloxy]-butane
3-methoxy-2-(trans-4-n-pentylcyclohexylcarbonyloxy)-butane
3-ethoxy-2-(trans-4-n-pentylcyclohexylcarbonyloxy)-butane
3-propoxy-2-(trans-4-n-pentylcyclohexylcarbonyloxy)-butane
3-butoxy-2-(trans-4-n-pentylcyclohexylcarbonyloxy)-butane
3-pentoxy-2-(trans-4-n-pentylcyclohexylcarbonyloxy)-butane
3-hexoxy-2-(trans-4-n-pentylcyclohexylcarbonyloxy)-butane
3-heptoxy-2-(trans-4-n-pentylcyclohexylcarbonyloxy)-butane and
3-decoxy-2-(trans-4-n-pentylcyclohexylcarbonyloxy)-butane

EXAMPLE 4

1 g of D-(−)-2,3-butanediol, 14.8 g of 2-[4-trans,trans-(4-n-heptylcyclohexyl)-cyclohexyl]-bromoethane and 2 g of tetrabutylammonium hydrogen sulfate are dissolved in 20 ml of toluene at 60°, a solution of 15 g of sodium hydroxide in 30 ml of water is added and the mixture is stirred intensively at 60° for 20 hours. The organic phase is then separated off. After customary working up, optically active 2,3-bis-2-[4-trans,trans-(4-n-heptylcyclohexyl)-cyclohexyl]-ethoxybutane is obtained.

The following compounds are prepared analogously:
2,3-bis-2-[4-trans,trans-(4-ethylcyclohexyl)-cyclohexyl]-ethoxybutane,
2,3-bis-2-[4-trans,trans-(4-butylcyclohexyl)-cyclohexyl]-ethoxybutane
2,3-bis-2-[4-trans,trans-(4-pentylcyclohexyl)-cyclohexyl]-ethoxybutane
2,3-bis-2-[4-trans,trans-(4-decylcyclohexyl)-cyclohexyl]-ethoxybutane
2,3-bis-2-(trans-4-ethylcyclohexyl)-ethoxybutane
2,3-bis-2-(trans-4-butylcyclohexyl)-ethoxybutane
2,3-bis-2-(trans-4-pentylcyclohexyl)-ethoxybutane
2,3-bis-2-(trans-4-heptylcyclohexyl)-ethoxybutane
2,3-bis-2-(trans-4-decylcyclohexyl)-ethoxybutane
2,3-bis-2-[trans-4-(p-ethylphenyl)-cyclohexyl]-ethoxybutane
2,3-bis-2-[trans-4-(p-butylphenyl)-cyclohexyl]-ethoxybutane
2,3-bis-2-[trans-4-(p-pentylphenyl)-cyclohexyl]-ethoxybutane 2,3-bis-2-[trans-4-(p-heptylphenyl)-cyclohexyl]-ethoxybutane
2,3-bis-2-[trans-4-(p-cyanophenyl)-cyclohexyl]-ethoxybutane and
2,3-bis-2-[trans-4-(p-fluorophenyl)-cyclohexyl]-ethoxybutane.

Examples of liquid crystal phases according to the invention containing at least one optically active compound of the formula I follow. In each case the absolute value of the pc product is given.

EXAMPLE A

A liquid crystal phase of 1.2% of 2,3-bis-(p-trans-4-n-pentylcyclohexylbenzoyloxy)-butane, dissolved in RO-TN 404, exhibits, with right-handedness of the helix structure, a pc product of 36.5 $\mu$m.% by weight at 25°.

EXAMPLE B

A liquid crystal phase of 3.0% of 2,3-bis-(p-hexoxybenzoyloxy)-butane, dissolved in RO-TN 404 (ZLI 1132), exhibits, with right-handedness of the helix structure, a pc product of 13.7 (20.0) $\mu$m.% by weight at 25°.

EXAMPLE C

A liquid crystal phase of 35% of 2,3-bis-(p-trans-4-n-heptylcyclohexylbenzoyloxy)-butane, dissolved in RO-TN 404, exhibits, with right-handedness of the helix structure, a pc product of 36.5 $\mu$m.% by weight at 25°.

EXAMPLE D

A liquid crystal phase of 2.4% of 2,3-bis-(trans,trans-4-pentylcyclohexylcyclohexyl-4'-carbonyloxy)-butane, dissolved in RO-TN 404 (ZLI 1132), exhibits, with left-handedness of the helix structure, a pc product of 116 (96) $\mu$m.% by weight at 25°.

EXAMPLE E

A liquid crystal phase of 1.6% of 2,3-bis-[p-(p'-hexoxybenzoyloxy)-benzoyloxy]-butane, dissolved in RO-TN 404 (ZLI 1132), exhibits, with right-handedness of the helix structure, a pc product of 30.3 (51.1) $\mu$m.% by weight at 25°.

EXAMPLE F

A liquid crystal phase of 0.1% of 2,3-bis-[p-(p'-trans-4-n-pentylcyclohexylphenyl)-benzoyloxy]-butane, dissolved in RO-TN 404, exhibits, with right-handedness of the helix structure, a pc product of 55.8 $\mu$m.% by weight at 25°.

EXAMPLE G

A liquid crystal phase of 0.05% of 2,3-bis-(p-(R)-2-methylbutylbenzoyloxy)-butane, dissolved in ZLI-1132, exhibits, with right-handedness of the helix structure, a pc product of 9.2 $\mu$m.% by weight at 25°.

EXAMPLE H

The liquid crystal phase of Example D (2.4% of 2,3-bis-(trans,trans-4-pentylcyclohexyl-cyclohexyl-4'-carbonyloxy)-butane, dissolved in RO-TN 404), exhibits, with left-handedness of the helix structure, a pc product of 140 $\mu$m.% by weight at 10° and a pc product of 24 $\mu$m.% by weight at 100° C., which corresponds to a change in the M/pc from −4.4 at 10° to −25.9 at 100°.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid crystal phase comprising at least two components, the improvement wherein at least one component is an optically active compound of the formula $$R^1-CHCH_3-CHCH_3-R^2$$

wherein $R^1$ and $R^2$ independently of one another are each $-Z^1-(A^1)_m-Z^2-(A^2)_n-Y$, wherein $A^1$ and $A^2$ in each case independently of one another are 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)-octylene, or one of said groups mono-substituted or poly-substituted by F, Cl, Br, CN, alkyl of up to 12 C atoms, or $C_{1-12}$ alkyl wherein 1 or 2 non-adjacent $CH_2$ groups are replaced by 0 atoms, $Z^1$ is $-O-CO-$, $-CO-O-$, $-O-$ or a single bond, $Z^2$ is $-CO-O-$, $-O-CO-$, $-CH_2CH_2-$, $-OCH_2-$, $-CH_2O-$, $-CH=N-$, $-N=CH-$, $-N=N-$, $-N(O)=N-$ or a single bond, m and n in each case independently of one another are 0, 1 or 2 with the proviso that in each of $R^1$ and $R^2$, one of m and n is not zero when $Z^1$ and $Z^2$ are both single bonds, and Y is alkyl of up to 12 C atoms, or $C_{1-12}$-alkyl wherein 1 or 2 non-adjacent $CH_2$ groups are replaced by 0 atoms, or, if n is 1 or 2, Y can also be F, Cl, Br or CN.

2. A liquid crystal phase of claim 1 wherein the amount of said compound is 0.05–3% by weight.

3. A liquid crystal phase of claim 2 comprising only one chiral compound having at least two of said chiral centers.

4. A liquid crystal phase of claim 1 comprising only one of said compounds.

5. A liquid crystal phase of claim 1 wherein the amount of said compound is effective to render the threshold voltage of said liquid crystal phase when used in a liquid crystalline electrooptical cell essentially constant as a function of temperature.

6. A liquid crystal phase of claim 1 wherein the optically active compound is of the formula $Y-CHCH_3-CHCH_3-Z^1-A^1-Z^2-(A^1)_2-Y$
$YCOO-CHCH_3-CHCH_3-OCOY$
$YCOO-CHCH_3-CHCH_3-Z^1-A^1-Y$
$YCOO-CHCH_3-CHCH_3-Z^1-A^1-A^2-Y$
$YCOO-CHCH_3-CHCH_3-Z^1-A^1-Z^2-A^2-Y$
$YCOO-CHCH_3-CHCH_3-Z^1-(A^1)_2-Z-2-A^2-Y$
$YCOO-CHCH_3-CHCH_3-Z^1-A^1-Z^2-(A^2)-2-Y$
$Y-A^1-Z^1-CHCH_3-CHCH_3-Z^1-A^1-Y$
$Y-A^1-Z^1-CHCH_3-CHCH_3-Z^1-A^1-A^2-Y$
$Y-A^1-Z^1-CHCH_3-CHCH_3-Z^1-A^1-Z-2-A^2-Y$
$Y-A^1-Z^1-CHCH_3-CHCH_3-Z^1-(A^1)_2-Z-2-A^2-Y$

Y—A$^1$—Z$^1$—CHCH$_3$—CHCH$_3$—Z$^1$—A$^1$—Z$^2$—(A$^2$)$_2$—Y

Y—A$^1$—A$^2$—Z$^1$—CHCH$_3$—CHCH$_3$—Z$^1$—A$^1$—A$^2$—Y

Y—A$^1$—A$^2$—Z$^1$—CHCH$_3$—CHCH$_3$—Z$^1$—A$^1$—Z$^2$—A$^2$—Y

Y—A$^2$—Z$^2$—A$^1$—Z$^1$—CHCH$_3$—CHCH$_3$—Z$^1$—A$^1$—Z$^2$—A$^2$—Y.

7. A liquid crystal phase of claim 6 wherein the amount of chiral compound having at least two of said chiral centers is 0.05-3% by weight.

8. A liquid crystal phase of claim 1 wherein in the optically active compound, R$_1$ and R$_2$ are independently each —Cy—Phe—Y
—Phe—Cy—Y
—Phe—Phe—Y
—Cy—Cy—Y
—Phe—Phe—Phe—Y
—Cy—Phe—Phe—Y
—Cy—Cy—Phe—Y
—Dio—Phe—Phe—Y
—Dio—Cy—Y
—Dio—Phe—Y
—Pyr—Phe—Y
—Pyr—Cy—Y
—A$^1$—CH$_2$CH$_2$—A$^2$—Y
—A$^1$—OCO—A$^2$—Y
—Cy—Ph—CH$_2$CH$_2$—Cy—Y
—Cy—COO—Cy—Y
—Cy—COO—Ph—Y, or
—Ph—COO—Ph—Y wherein "Phe" is 1,4-phenylene, "Cy" is 1,4-cyclohexylene, "Dio" is 1,3-dioxane-2,5-diyl, and "Pyr" is pyrimidine-2,5-diyl.

9. In an electro-optical cell comprising a liquid crystal phase, the improvement wherein the liquid crystal phase is one of claim 6.

10. In an electro-optical cell comprising a liquid crystal phase, the improvement wherein the liquid crystal phase is one of claim 1.

11. In an electro-optical cell comprising a liquid crystal phase, the improvement wherein the liquid crystal phase is one of claim 5.

12. A method for achieving temperature compensation in a liquid crystal display element containing a liquid crystal phase, comprising including in said phase at least 0.05% of at least one chiral compound having at least two chiral centers which are adjacent or separated from one another by an acyclic chain, wherein said chiral compound is of the formula

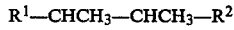

R$^1$—CHCH$_3$—CHCH$_3$—R$^2$ wherein
R$^1$ and R$^2$ independently of one another are each —Z$^1$—(A$^1$)$_m$—Z$^2$—(A$^2$)$_n$—Y, wherein A$^1$ and A$^2$ in each case independently of one another are 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)-octylene, or one of said groups mono-substituted or poly-substituted by F, Cl, Br, CN, alkyl of up to 12 C. atoms, or C$_{1-12}$ alkyl wherein 1 or 2 non-adjacent CH$_2$ groups are replaced by 0 atoms, Z$^1$ is —O—CO—, —CO—O—, —O— or a single bond, Z$^2$ is —CO—O—, —O—CO—, —CH$_2$CH$_2$—, —OCH$_2$—, —CH$_2$O—, —CH=N—, —N=CH—, —N=N—, —N(O)=N— or a single bond, m and n in each case independently of one another are 0, 1 or 2 with the proviso that in each of R$^1$ and R$^2$, one of m and n is not zero when Z$^1$ and Z$^2$ are both single bonds, and Y is alkyl of up to 12 C atoms, or C$_{1-12}$-alkyl wherein 1 or 2 non-adjacent CH$_2$ groups are replaced by 0 atoms, or, if n is 1 or 2, Y can also be F, Cl, Br or CN.

13. A method for rendering the electro-optical properties of a liquid crystal phase essentially independent of temperature comprising adding thereto at least 0.05% of at least one chiral compound having at least two chiral centers which are adjacent or separated from one another by an acyclic chain, wherein said chiral compound is of the formula

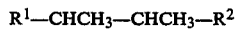

R$^1$—CHCH$_3$—CHCH$_3$—R$^2$ wherein
R$^1$ and R$^2$ independently of one another are each —Z$^1$—(A$^1$)$_m$—Z$^2$—(A$^2$)$_n$—Y, wherein A$^1$ and A$^2$ in each case independently of one another are 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)-octylene, or one of said groups mono-substituted or poly-substituted by F, Cl, Br, CN, alkyl of up to 12 C atoms, or C$_{1-12}$ alkyl wherein 1 or 2 non-adjacent CH$_2$ groups are replaced by 0 atoms, Z$^1$ is —O—CO—, —CO—O—, —O— or a single bond, Z$^2$ is —CO—O—, —O—CO—, —CH$_2$CH$_2$—, —OCH$_2$—, —CH$_2$O—, —CH=N—, —N=CH—, —N=N—, —N(O)=N— or a single bond, m and n in each case independently of one another are 0, 1 or 2 with the proviso that in each of R$^1$ and R$^2$, one of m and n is not zero when Z$^1$ and Z$^2$ are both single bonds, and Y is alkyl of up to 12 C atoms, or C$_{1-12}$-alkyl wherein 1 or 2 non-adjacent CH$_2$ groups are replaced by 0 atoms, or, if n is 1 or 2, Y can also be F, Cl, Br or CN.

14. A liquid crystal phase of claim 1, wherein for all Y groups, all alkyl portions are straight chained.

15. A liquid crystal phase of claim 1, wherein in R$^1$ and R$^2$, one of n and m is not 0.

16. In a liquid crystal phase comprising at least two components, the improvement wherein at least one component is an optically active compound of the formula

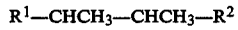

R$^1$—CHCH$_3$—CHCH$_3$—R$^2$ wherein R$^1$ and R$^2$ independently of one another are each —Z$^1$—(A$^1$)$_m$—Z$^2$—(A$^2$)$_n$—Y, wherein A$^1$ and A$^2$ in each case independently of one another are 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)-octylene, or one of said groups monosubstituted or polysubstituted by F, Cl, Br, CN, alkyl of up to 12 C atoms, or C$_{1-12}$ alkyl wherein 1 or 2 non-adjacent CH$_2$ groups are replaced by 0 atoms, Z$^1$ is —O—CO—, —CO—O—, —O— or a single bond, Z$^2$ is —CO—O—, —O—CO—, —CH$_2$CH$_2$, —OCH$_2$, —CH$_2$O—, —CH=N—, —N=CH—, —N=N—, —N(O)=N— or a single bond, m and n in each case independently of one another are 0, 1 or 2, and Y is alkyl of up to 12 C atoms, or C$_{1-12}$alkyl wherein 1 or 2 non-adjacent CH$_2$ groups are replaced by 0 atoms, or, if n is 1 or 2, Y can also be F, Cl, Br or CN, wherein for all Y groups, all alkyl portions are straight chained.

17. In a liquid crystal phase comprising at least two components, the improvement wherein at least one component is an optically active compound of the formula $$R^1—CHCH_3—CHCH_3—R^2$$

wherein $R^1$ and $R^2$ independently of one another are each $—Z^1—(A^1)_m—Z^2—(A^2)_n—Y$, wherein $A^1$ and $A^2$ in each case independently of one another are 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)-octylene, or one of said groups mono-substituted or poly-substituted by F, Cl, Br, CN, alkyl of up to 12 C atoms, or $C_{1-12}$ alkyl wherein 1 or 2 non-adjacent $CH_2$ groups are replaced by 0 atoms, $Z^1$ is $—O—CO—$, $—CO—O—$, $—O—$ or a single bond, $Z^2$ is $—CO—O—$, $—O—CO—$, $—CH_2CH_2—$, $—OCH_2—$, $—CH_2O—$, $—CH=N—$, $—N=CH—$, $—N=N—$, $—N(O)=N—$ or a single bond, m and n in each case independently of one another are 0, 1, or 2, and Y is alkyl of up to 12 C atoms, or $C_{1-12}$-alkyl wherein 1 or 2 non-adjacent $CH_2$ groups are replaced by 0 atoms, or, if n is 1 or 2, Y can also be F, Cl, Br or CN, wherein in each of $R^1$ and $R^2$, one of n and m is not zero.

* * * * *